(No Model.)
H. H. WARDWELL.
SECONDARY BATTERY.
No. 424,152. Patented Mar. 25, 1890.
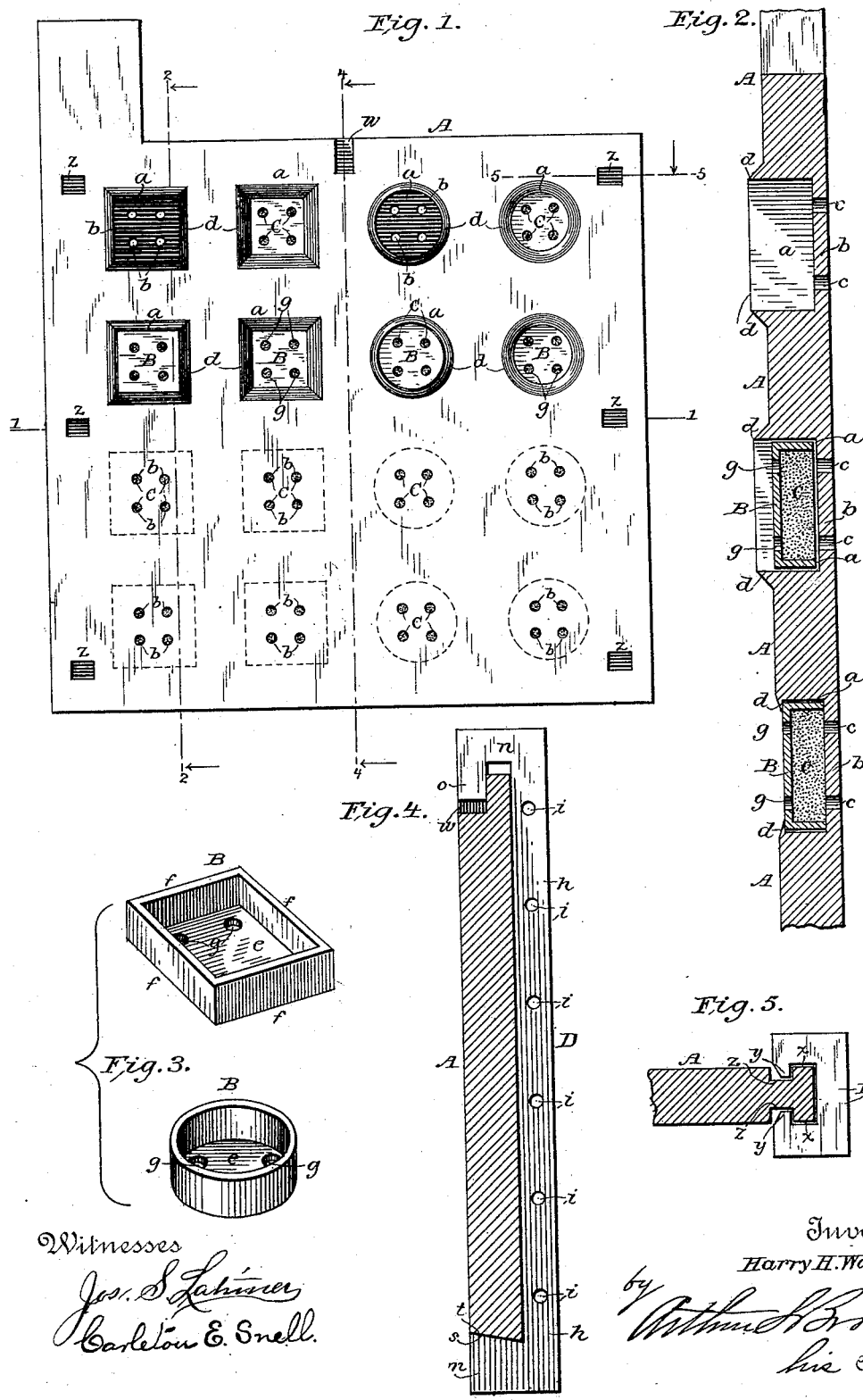
Witnesses
Jos. S. Latimer
Carleton E. Snell
Inventor
Harry H. Wardwell
by Arthur S. Browne
his Attorney

UNITED STATES PATENT OFFICE.

HARRY H. WARDWELL, OF LAKE VILLAGE, NEW HAMPSHIRE.

SECONDARY BATTERY.

SPECIFICATION forming part of Letters Patent No. 424,152, dated March 25, 1890.

Application filed October 14, 1889. Serial No. 326,927. (No model.)

*To all whom it may concern:*

Be it known that I, HARRY H. WARDWELL, of Lake Village, in the county of Belknap and State of New Hampshire, have invented certain new and useful Improvements in Secondary Batteries, of which the following is a specification.

The present improvements relate to the means for securing the active material to the plates of a secondary or storage battery, and to the means for holding said plates in position, and for insulating adjacent plates from each other.

The improvements are illustrated in the accompanying drawings, in which—

Figure 1 is a side view of one of the plates of a secondary battery, the portion above the line 1 1 representing one side of the plate and the portion below said line the opposite side of the plate, this figure also showing the plate in both its primary and completed conditions. Fig. 2 is a fragmentary cross-section of the plate, on an enlarged scale, in a plane indicated by the line 2 2 in Fig. 1. Fig. 3 is a detail perspective view of one of the cups or shells. Fig. 4 is a vertical section of the plate on a plane indicated by the line 4 4 in Fig. 1, showing one of the insulating dividing strips or spacers; and Fig. 5 is a horizontal section in a plane indicated by the line 5 5 in Fig. 1, showing an insulator for the edges of the plates.

In carrying out the first portion of the invention, relating to the means for securing the active material to the plates or electrodes, each plate A is formed with a plurality of apertures or cavities $a\ a$. The plate or electrodes A are composed of any suitable material, such as are well known in the art, being by preference, however, composed of lead. In the preferred construction the cavities $a\ a$ are primarily formed in the lead plates. Each cavity extends laterally partly through the plate in which it is formed, and it is entirely open on one side. On the opposite side, however, of the plate the cavity is closed by a thin retaining-wall $b$, which constitutes an integral portion of the plate having its outer surface flush with the surface of the plate. Each wall $b$ is perforated with a plurality of apertures $c\ c$, establishing communication on that side of the plate with the cavity $a$. Around the margin of the open side or mouth of each cavity the plate is primarily formed with a slightly-raised peripheral ledge $d$ integral with the plate and projecting outwardly beyond the general surface thereof. These cavities $a\ a$ may be of any desired shape—circular or polygonal—and of any suitable size, and each plate or electrode is provided with any desired number of the cavities. These cavities constitute chambers for holding the active material C. The active material C is not, however, placed directly in the cavities $a\ a$, but is primarily placed in small cups or shells B B. The active material employed is preferably red lead or litharge; but any of the active materials known in the art may be employed. The cups or shells B B are adapted in size and shape to the cavities $a\ a$. Each shell is five-sided—that is, it is provided with a closed bottom wall $e$ and four side walls $f\ f$—and it thus has an open mouth. The bottom wall $e$, however, of each shell is perforated with a plurality of apertures $g\ g$. The thickness of each shell B is substantially equal to or slightly less than the depth of the cavities $a$, exclusive of the ledges $d\ d$. The cups or shells B are composed of any of the known materials used for the plates or electrodes A, but are preferably of lead or copper. The shells are first filled with the active material C even with their open mouths. The shells are then inserted in the several and respective cavities, in which they fit snugly. In inserting the shells in place their open ends or mouths should be placed within the cavities, so that when the shells are in place the active material is confined between the fixed outer wall $b$ of the cavity and the bottom wall $e$ of the shells. In order to retain the shells in position within the cavities, the raised marginal ledges $d\ d$ are flattened down against the bottom walls of the shell, thus pressing them tightly in place and rendering the surface of the plate a plane. When the plate is thus completed, the cups or shells B B constitute permanent portions thereof, and free access to the active material is given to the acid on both sides of the plates by means of the apertures $c\ c$ and $g\ g$ in the walls $b\ b$ and $e\ e$, respectively. In this manner the plates or electrodes of a secondary battery are quickly and cheaply made, and the active material is retained therein securely, so that the plates or electrodes may be used indefinitely. The plates A A need not necessarily be plates primarily formed with receiving-cavities $a$ $a$. The cups or shell (previously filled with the active material) may be suitably disposed in a properly-constructed casting flask or mold, into which the metal of which the plates A are formed may be cast, thus accomplishing the same result as in the first-described manner of constructing the plates. Since casting the plates about and around cores of the active material of a secondary battery is a method well known in the art, a detailed description of such method as applied to the present invention is not here given. A plate or electrode of a secondary battery so formed contains the essential and characteristic feature of the present invention, which consists in an open-mouthed perforated shell or cup in which the active material is primarily placed, said shell or cup subsequently constituting a permanent portion of the plate or electrode, and said plate or electrode having an integral portion closing the open mouth of the cup or shell.

The second portion of the invention relates to the means for insulating adjacent plates or electrodes from each other and from the side walls and bottom of the cell or battery-case. Each plate or electrode is insulated from the next adjoining plate and held above the bottom of the cell by means of dividers or spacers D, composed of hard rubber or other insulating material. Each divider or spacer is composed of a vertical bar $h$, which is perforated with apertures $i$ $i$ for facilitating the circulation of the battery fluid, of a bottom offset $m$, and a top offset $n$, having a downwardly-projecting tongue $o$. The upper surface or shoulder $s$ of the lower offset $m$ inclines downwardly toward the vertical bar, and on this inclined shoulder rests the lower beveled edge $t$ of the plate or electrode A. Each plate or electrode A has on one of its upper horizontal edges one or more notches or recesses $w$, with which the downwardly-projecting tongues $o$ of the upper offsets $n$ respectively engage. The horizontal distance between the tongue $o$ and its bar $h$ is less than the general thickness of the plate A, so that the dividers or spacers can be connected to the plate only at the points where the notches $w$ are located. The tongues $o$ do not project beyond the horizontal face of the plate A, nor does the bottom offset $m$, so that adjacent plates are separated only by the thickness of the bar $h$. There may be attached to each plate as many of the dividers or spacers as are necessary or desirable, two, however, being a proper number, one near each end of the plate. In case it is desired to remove one of the plates A it can be lifted out with its attached dividers or spacers without disturbing adjacent plates or dislocating the dividers or spacers. The apertures $i$ $i$ in the dividers or spacers extend laterally therethrough. The dividers or spacers are comparatively thin, so that they occupy only a small portion of the space between adjacent plates or electrodes, and the apertures $i$ $i$ establish communication between the portions of such space on opposite sides of each divider or spacer.

The edge insulators consist of plates E E of hard rubber or other insulating material. Each edge insulator is provided with a T-shaped notch or recess $x$, the extreme width of which is equal to the thickness of the plates A. The mouth of the notch is contracted by means of oppositely-projecting lugs $y$ $y$, beveled on their outer adjacent edges. Each plate A is provided near each vertical edge with a suitable number of recesses $z$ $z$ on opposite faces. Each pair of recesses $z$ $z$ on opposite faces are arranged in line with each other, and into these recesses the lugs $y$ $y$ are sprung, there being sufficient elasticity in the edge insulators to enable them to spread apart sufficiently to permit the lugs to pass over the thick edges of the plates A.

Ordinarily one edge insulator on each vertical edge of each plate is sufficient; but each plate is preferably provided with a plurality of recesses $z$ $z$ on each edge in different vertical planes, so that the edge insulators on adjacent plates can be placed at different heights, in order that the projecting portions of the edge insulators on adjacent plates need not interfere with each other, and so keep the several plates spaced at too great intervals.

I claim as my invention—

1. In a secondary battery, a plate or electrode thereof having cavities formed therein, each cavity being open at one side of the plate and having a perforated bottom formed integrally with the plate, said cavities being adapted for the retention of active material, substantially as set forth.

2. In a secondary battery, cups or shells, each having an open mouth and a perforated bottom, into which cups or shells the active material is primarily placed, in combination with a plate or electrode with which said cups or shells are subsequently united, portions of which plate or electrode cover the open mouths of said cups or shells, substantially as set forth.

3. In a secondary battery, cups or shells, each having an open mouth and a perforated bottom into which cups or shells the active material is primarily placed, in combination with a plate or electrode with which said cups or shells are subsequently united, perforated portions of which plate or electrode cover the open mouths of said cups or shells, substantially as set forth.

4. In a secondary battery, a plate or electrode thereof primarily formed with recesses or cavities, each of said cavities being open on one side of the plate and closed on the opposite side by a perforated wall, in combination with cups or shells filled with active material, each cup or shell having an open mouth and a perforated bottom, and each cup or shell being placed within one of said cavities with its open mouth adjacent to the perforated wall of the cavity, substantially as set forth.

5. In a secondary battery, a plate or electrode thereof primarily formed with recesses or cavities and with a peripheral projecting marginal ledge around each cavity projecting outwardly beyond the general surface of the plate or electrode, in combination with cups or shells filled with active material fitting within said cavities and adapted to be confined therein by the flattening down of said projecting ledges, substantially as set forth.

6. In a secondary battery, the plates or electrodes thereof, in combination with insulating dividers or spacers between adjacent plates or electrodes, each divider having a vertical bar, a bottom offset having an inclined shoulder, and an upper offset having a downwardly-projecting tongue, each of said plates or electrodes having a beveled lower edge resting on said inclined shoulder, and having one or more notches on its upper edge, in which said projecting tongues fit, substantially as set forth.

7. In a secondary battery, a plate or electrode thereof having recesses near a vertical edge on opposite sides, in combination with an edge insulator having a notch fitting over the vertical edge of the plate, and inwardly-projecting lugs which enter said recesses, substantially as set forth.

In witness whereof I have hereunto signed my name in the presence of two subscribing witnesses.

HARRY H. WARDWELL.

Witnesses:
JOHN ALDRICH,
HERBERT S. YOUNG.